Nov. 3, 1931.  T. B. TIEFENBACHER  1,830,250
OUTLET BOX FITTING
Filed April 2, 1929
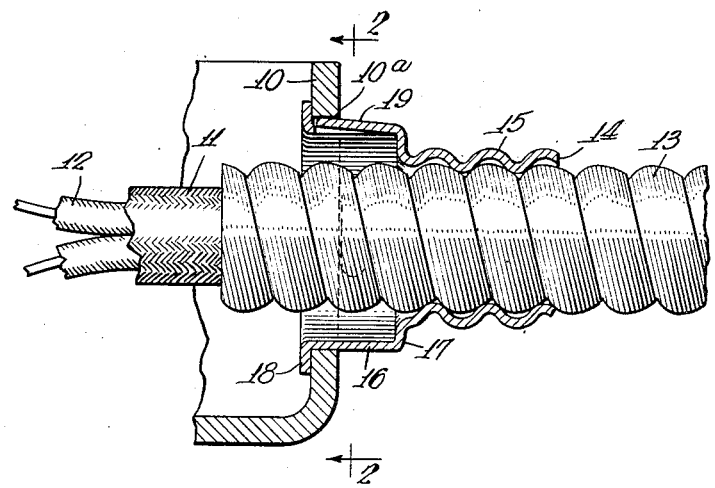
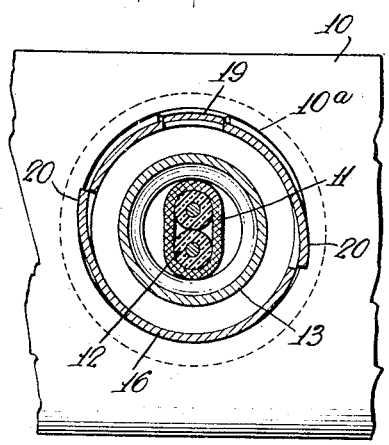
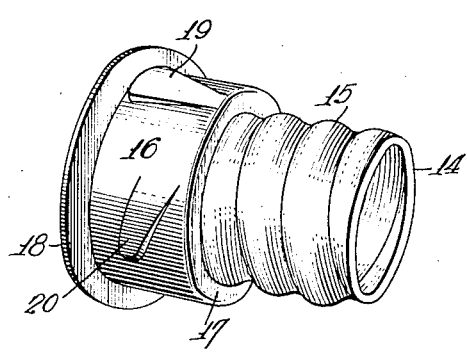
INVENTOR
Thomas B. Tiefenbacher
BY
Franklin J. Foster
ATTORNEY Patented Nov. 3, 1931

1,830,250

UNITED STATES PATENT OFFICE

THOMAS B. TIEFENBACHER, OF ELIZABETH, NEW JERSEY

OUTLET BOX FITTING

Application filed April 2, 1929. Serial No. 352,035.

The device of the present invention, while capable of other uses is primarily intended as a fitting for armored cable and is adapted to hold a length of such cable in proper relation to an electrical outlet box or equivalent outlet or support device.

The fitting is characterized by extreme simplicity, being preferably in the form of a unitary stamping element for engagement with the box and the cable armor, and involving no need whatever for changes in the present standard construction of the armor or the boxes.

As opposed to prior devices for a similar purpose the fitting or coupling may be attached to the armor and drawn through the outlet box opening to a position where it is automatically self-locking against either rotative or axial movement, no special nuts, set screws or equivalent clamping devices being required, either to couple the armor shell to the fitting or the fitting to the box.

The device is of simple, practical, rugged, durable construction, well-suited to meet the requirements of economical manufacture, and convenient manipulation.

With the above noted and other objects in view, the invention consists in certain novel features of construction and combinations and arrangements of parts which will be more fully hereinafter described and pointed out in the claims.

The invention may be more fully understood from the following description in connection with the accompanying drawings, wherein:

Fig. 1 is a sectional view showing the fitting in operative position to secure an armored cable to an outlet box.

Fig. 2 is a transverse sectional view on the line 2—2 of Fig. 1, and

Fig. 3 is a perspective view of the fitting.

In the drawings numeral 10 represents a conventional outlet box and 11 a wire cable covered with the conventional spirally wound armor 13, part of this armor being cut away to expose the conductors 12 to be spliced to other wires within the box 10.

The fitting which is used to secure the armored cable in place and which forms the subject matter of the present invention comprises a generally cylindrical metal stamping, open at both ends. The reduced end 14 of the fitting has a spiral thread 15 rolled or otherwise produced therein, this thread being of a suitable type for screw threaded engagement with the cable armor 13.

The other unthreaded and enlarged end 16 of the fitting is united to portion 14 by an annular shoulder 17 and at its rear end is externally flanged at 18.

The larger end 16 of the fitting is of an external diameter which lets it be slipped conveniently through the outlet box opening 10a. The flange 18, however, is of greater diameter than the opening to hold the fitting against outward displacement through the opening.

To hold the fitting against rotation in the opening a longitudinally disposed spring tongue 19 is struck outwardly from the shell portion 16, the free end of this tongue being disposed rearwardly. This tongue is depressed as the fitting is pulled or forced outwardly through the box until flange 18 abuts the inner box wall. At this time the tongue will be under considerable compression and will strongly frictionally resist casual rotative movement of the fitting within the opening.

The means for preventing retrograde movement of the fitting after it has been pushed through the hole includes a pair of spring tongues 20 also struck outwardly from fitting portion 16 and having their longitudinal axes following the circumference of the cylindrical shell.

The forward edges of these tongues are inclined rearwardly from the attached to the free ends thereof, so that they act as cams to permit depression of the tongues as the box is pulled through the hole. Slight twisting of the fitting as it passes through the opening assists this camming action, but is by no means vital to the operation. The rear edges of the tongues 20 lie parallel with the wall of the outlet box. When the tongues are passing through the opening they are cammed in or depressed. As soon as they clear the opening they snap outwardly and their straight rear edges abut the face of the box to prevent accidental retrograde movement of the fitting.

In attaching the cable to the box, part of the armor is cut away to expose the desired amount of the wire.

The fitting is then slipped over the wire after the latter has been thrust into the box through hole 10a. The fitting is screwed onto the end of the armor, and the latter withdrawn pulling the fitting outwardly through opening 10a to an extent limited by flange 18. By the time this flange engages the inner face of the outlet box, tongues 20 will have cleared the opening and snapped into proper blocking position and the compressed spring tongue 19 will be exerting a strong frictional drag on the wall of the opening to prevent inadvertent twisting or rotative movement of the fitting. When the fitting is to be removed, pliers may be used to force tongues 20 inwardly so the fitting may be passed back into the box.

Obviously if desired the fitting could be snapped into place within the box and the cable subsequently screwed into it.

It will thus be seen that there is herein described a device in which the several features of this invention are embodied, and which device in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

What I claim is:

1. A fitting of the class described including a unitary metal shell of generally cylindrical contour and including cylindrical end portions of different diameters, the smaller end being threaded to receive a cable armor and the larger end portion being flanged to engage the inner face of an outlet box.

2. A fitting of the class described including a unitary metal shell of generally cylindrical contour and including cylindrical end portions of different diameters, the smaller end being threaded to receive a cable armor and the larger end portion being flanged to engage the inner face of an outlet box, said end being adapted to approximately fit an outlet box opening and a spring tongue integral with said end frictionally engaging the wall of the opening to hold the fitting against rotation therein.

3. A fitting of the class described including a unitary metal shell of generally cylindrical contour and including cylindrical end portions of different diameters, the smaller end being threaded to receive a cable armor and the larger end portion being flanged to engage the inner face of an outlet box, said end being adapted to approximately fit an outlet box opening and tongues struck from the larger end of the body, compressible as the body is pushed through the opening from the inside of the box and adapted to snap outwardly as they clear the opening to block retrograde movement of the fitting.

4. A fitting of the class described including a unitary metal shell of generally cylindrical contour and the outer end thereof being threaded to receive a cable armor and the inner end portion thereof being flanged to engage the inner face of an outlet box, said end being adapted to approximately fit an outlet box opening, a spring tongue integral with said end tensioned as an incident of frictionally engaging the wall of the opening to hold the fitting against rotation therein, and tongues struck from the larger end of the body, compressible as the body is pushed through the opening and adapted to snap outwardly as they clear the opening to block retrograde movement of the fitting.

5. A device for coupling an armored cable to an outlet box including a unitary metal shell, one end of which is adapted to fit an opening in an outlet box and includes means to limit the outward movement of the shell through the opening, the other end of the shell including means to receive and secure the armor of the cable, means integral with the shell to prevent rotation thereof in the opening.

6. A device for coupling an armored cable to an outlet box including a unitary metal shell, one end of which is adapted to fit an opening in an outlet box and includes means to limit the outward movement of the shell through the opening, the other end of the shell including means to receive and secure the armor of the cable, means integral with the shell to prevent retrograde movement thereof after the shell has been passed outwardly through the opening to the extent permitted by said limiting means.

7. A device for coupling an armored cable to an outlet box including a unitary metal shell, one end of which is adapted to fit an opening in an outlet box and includes means to limit the outward movement of the shell through the opening, the other end of the shell including integral means shaped to receive and secure the armor of the cable, spring tongues integral with the shell to prevent retraction thereof when fully projected.

8. A device for coupling an armored cable to an outlet box including a unitary metal shell, one end of which is adapted to fit an opening in an outlet box and includes means to limit the outward movement of the shell through the opening, the other end of the shell including means to receive and secure the armor of the cable, spring tongues integral with the shell to prevent retraction thereof when fully projected, said tongues extending circumferentially of the shell, and including straight box-engaging rear edges and inclined camming forward edges.

9. A device for coupling an armored cable to an outlet box including a unitary metal shell, one end of which is adapted to fit an opening in an outlet box and includes means to limit the outward movement of the shell through the opening, the other end of the shell including means to receive and secure the armor of the cable, a spring tongue integral with the shell to exert friction against the walls of the opening when the shell is in place therein, said tongue extending longitudinally of the shell and having its free end rearmost.

Signed at New York, in the county of New York and State of New York this 30th day of March, A. D., 1929.

THOMAS B. TIEFENBACHER.